United States Patent
Cho et al.

[11] Patent Number: 6,151,593
[45] Date of Patent: Nov. 21, 2000

[54] APPARATUS FOR AUTHENTICATING AN INDIVIDUAL BASED ON A TYPING PATTERN BY USING A NEURAL NETWORK SYSTEM

[75] Inventors: Sung-Zoon Cho, Kyungsangbuk-do; Dae-Hee Han, Daejon, both of Rep. of Korea

[73] Assignee: Postech Foundation, Kyungsangbuk-do, Rep. of Korea

[21] Appl. No.: 09/059,286

[22] Filed: Apr. 14, 1998

[30] Foreign Application Priority Data

Jul. 14, 1997 [KR] Rep. of Korea .................. 97-32564

[51] Int. Cl.[7] .................................................. G06F 15/18
[52] U.S. Cl. ............................................................ 706/16
[58] Field of Search .............................. 713/200; 706/16

[56] References Cited

U.S. PATENT DOCUMENTS

| | | | |
|---|---|---|---|
| 4,621,334 | 11/1986 | Garcia ...................................... | 382/115 |
| 5,060,263 | 10/1991 | Bosen et al. ............................. | 713/184 |
| 5,675,497 | 10/1997 | Petsche et al. .......................... | 702/182 |
| 5,764,889 | 6/1998 | Ault et al. ................................ | 713/200 |
| 5,793,952 | 8/1998 | Limsico ................................... | 713/202 |

OTHER PUBLICATIONS

Mohammad S. Obaidat, David T. Macchiarolo; "An On-line Neural Network System for Computer Access Security"; IEEE Transactions on industrial electronics, vol. 40, No. 2; pp. 235–242, Apr. 1993.

M. S. Obaidat, Balquies Sadoun: "Verification of Computer Users Using Keystroke Dynamics"; IEEE Transactions on systems, man, and cybernetics–Part B: Cybernetics, vol. 27, No. 2; pp. 261–269, Apr. 1997.

*Primary Examiner*—Tariq R. Hafiz
*Assistant Examiner*—George Davis
*Attorney, Agent, or Firm*—Bacon & Thomas, PLLC

[57] ABSTRACT

A user authentication apparatus for use in controlling access to a system inputs an owner's login name and password and then extracts the owner's timing vectors from keystroke characteristics with which the owner repeatedly types the owner's password to thereby form a training set. A neural network is trained by using each of the owner's timing vectors in the training set as an input. Thereafter, when a user inputs the owner's login name and password, it is checked if the user's password is identical to the owner's password. The user's timing vector is extracted from a keystroke characteristic to type the user's password if the checked result is affirmative, and the user is prohibited from accessing the system if otherwise. The user's timing vector is applied to the trained neural network as an input and a difference between the input and an output of the neural network is compared with a predetermined threshold. The user will be permitted to access the system if the difference is not greater than the threshold and prohibited from accessing the system if otherwise.

8 Claims, 3 Drawing Sheets

APPARATUS FOR AUTHENTICATING AN INDIVIDUAL BASED ON A TYPING PATTERN BY USING A NEURAL NETWORK SYSTEM

FIELD OF THE INVENTION

The present invention relates to a user authentication apparatus; and, more particularly, to a user authentication apparatus based on a password and a typing pattern to type the password by using a neural network.

DESCRIPTION OF THE PRIOR ART

There are normally three different approaches to system security: possession-based(key or card), biometrics-based (fingerprints or keystroke dynamics) and memory-based (password) devices. They are evaluated in such criteria as error rate, cost, user discomfort and environmental requirement. Each approach has merits and demerits. The possession-based methods are inexpensive and simple but could be too simple as anyone who possesses the key or card can gain access to a secured area. More sophisticated methods which employ fingerprints and retinal patterns involve an extra hardware device and increased user discomfort.

Passwords are the most widely used tool for computer access security. More often than desirable, however, easy-to-guess words such as a family member name, birthday, phone number, address and the like are chosen for a password, which may result in a security failure. Accordingly, variance other means shave been proposed to replace or be combined with the password.

One approach that is both inexpensive and simple is the keystroke dynamics. When a user types a word, for instance his password, the keystroke dynamics can be characterized by a timing vector consisting of duration times of key strokes and interval times between them. A word having N number of characters and "return key" result in a timing vector of dimension (2N+1). The owner's timing vectors are collected and used to build a model which protects the owner from impostors. This approach is inexpensive and causes no user discomfort. Moreover, it can be naturally combined with a password, thereby providing a twofold security.

The keystroke dynamics approach may have two types of errors. One is the false accept rate(FAR) denoting the ratio that an imposter passes; and the other is the false reject rate(FRR) denoting the ratio that the owner fails. One can be reduced at the expense of the other. An appropriate middle point is usually used as a threshold based on the relative cost of the errors. Another widely used error measure is FRR when FAR is limited to zero.

In the past, a short character string such as a password was regarded inadequate to be used for user authentication. A long string of 537 characters had to be employed to achieve 5.0%. FAR and 5.5% FRR(see G. Williams et al., "Dynamic Identity Verification via Keystroke Characteristics", *International Journal of Man-Machine Studies*, 35:859–870, 1991). Only recently, through the use of neural networks, a tolerable performance has been achieved with short strings such as real life names. However, the error rates are still too high to be practicable. In addition, the neural network is trained not only with the owner's timing vectors but also with the impostors' in advance, which is unacceptable in real life situation.

Also recently, 0% error rate was reported for user verification using 7 character-long login names (M. Obaidat et al., "Verification of Computer Users Using Keystroke Dynamics", *IEEE Transactions on System, Man and Cybernetics, part B:Cybernetics,* 27(2):261–269, 1997). However, impostors' typing patterns as well as the owner's typing patterns were used for training the neural network; the training data set was too large; and the training patterns and the test patterns were not chronologically separated.

Accordingly, there still exists a need to develope a user authentication apparatus which has low error rate and trains a neural network by using an owner's typing patterns only.

SUMMARY OF THE INVENTION

It is, therefore, a primary object of the invention to provide a user authentication apparatus based on a password and the user's typing pattern to type the password by using a neural network.

In accordance with an aspect of the present invention, there is provided a user authentication apparatus for use in controlling access to a system comprising: an input means for inputting an owner's login name and password, and a user's password; a password matching means for storing the owner's login name and the owner's password and checking whether the user's password is identical to the owner's password or not, to thereby generate a first indication signal; means for extracting the owner's timing vectors from keystroke characteristics with which the owner repeatedly types the owner's password to thereby form a training set and, in response to the first indication signal from the password matching means extracting a user's timing vector from a keystroke characteristic with which the user types the user's password; a neural network for being trained by using the training set and generating an output by using the user's timing vector as an input; means for comparing the difference between the user's timing vector that is inputted to the neural network and the corresponding output of the neural network with a predetermined threshold to thereby generate a second indication signal; and means for controlling access of the user to the system in response to the first and the second indication signals.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

User authentication based on typing patterns is challenging from a pattern classification point of view. It is a two class problem, i.e., an owner vs. impostors. However, typing patterns from only one class, the owner's, are available to train a neural network in advance since it is impossible to obtain enough typing patterns from all kinds of impostors. The only solution is to build a template of the owner's keystroke dynamics and use it to detect impostors.

The owner's timing vectors are used to train a multilayer perceptron(MLP) to be an autoassociator. The autoassociator uses a timing vector from a keystroke characteristic with which the owner types as both an input and a desired output. The MLP is trained to learn to encode certain properties only present in the owner's timing vectors at hidden layers. When a previously unseen timing vector of the owner arrives, the network outputs a vector that is reasonably close to the input. When an imposter's timing vector arrives, on the other hand, the network outputs a vector that is far from the input. That is, a timing vector X is classified as owner's if and only if $$\|X-M(X)\| < TH \qquad \text{Eq. (1)}$$

where M(X) denotes the MLP's output for input timing vector X and TH denotes a predetermined threshold.

Figure 1:
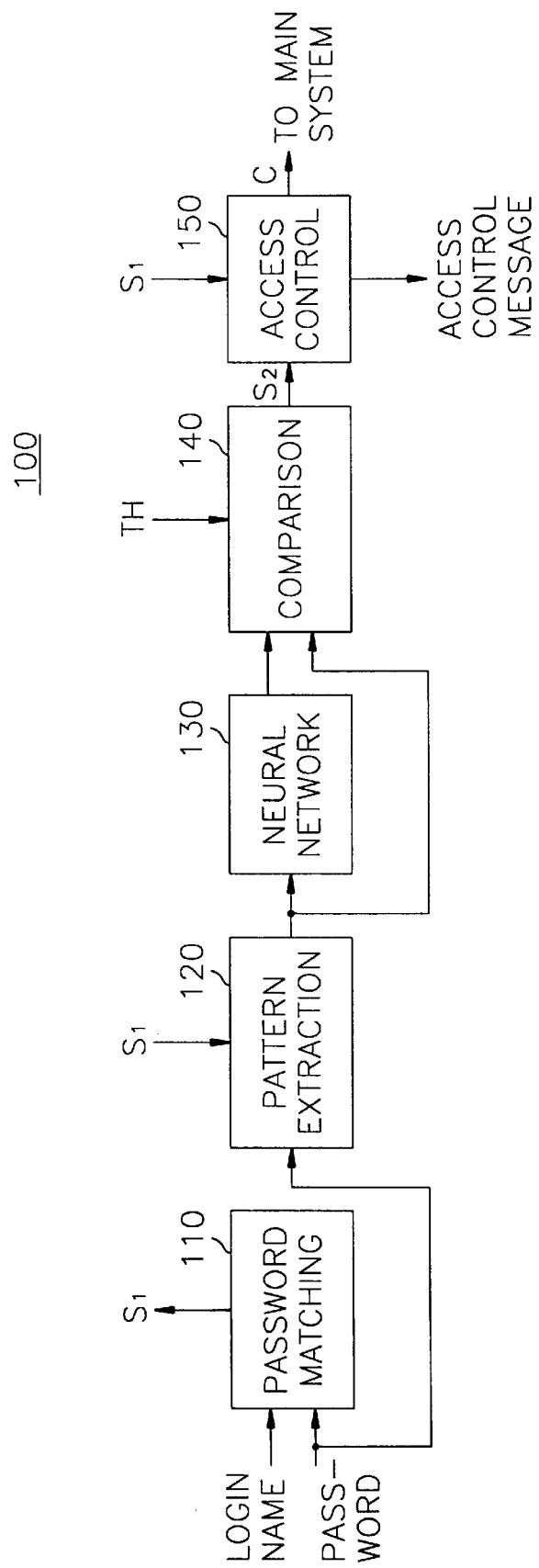
FIG. 1 represents a user authentication apparatus by using a neural network in accordance with a preferred embodiment of the present invention.

Referring to FIG. 1, there is represented a user authentication apparatus 100 by using a neural network in accordance with a preferred embodiment of the present invention. The function of each block will be illustrated according to cases, i.e., registration vs. verification.

At a registration step, a user who wants to be registered types his login name representing his identity and a corresponding password, by means of an input device, for example, a keyboard. Hereinafter, the user is referred to as an owner in order to distinguish the registered user from arbitrary users. The owner's login name is applied to a password matching block 110. And the owner's password is applied to the password matching block 110 and a pattern extraction block 120, simultaneously.

The password matching block 110 is sequentially provided with the owner's login name and password, then detects the owner's password to thereby store the owner's login name and password as a registered login name and a registered password, respectively. Then, the password matching block 110 provides a first indication signal S1 of level 1 to the pattern extraction block 120 and an access control block 150.

The access control block 150 displays an access control message of type 1 through a display device, for example, a monitor, in response to the first indication signal S1 of level 1, wherein the access control message of type 1 requires the owner to type the registered password one more time.

At the same time when the owner types the owner's password, the pattern extraction block 120 extracts an owner's timing vector from a keystroke characteristic with which the owner types the owner's password and, in response to the first indication signal S1 of level 1, stores the owner's timing vector, wherein the owner's timing vector consists of duration of key strokes and interval times between them. An example of a timing vector of a keystroke characteristic to type a password which consists of 7 number of characters is [120, 60, 120, 90, 120, 60, 150, −60, 120, −30, 120, −60, 120, 120, 90, 60, 150]. The dimension of the timing vector is 15 because the duration of "return key" is included. Each element in the timing vector is measured in milliseconds and a negative interval time results from a situation where a current key is stroked before a previous key is released.

Meanwhile, the owner types the registered password again in response to the access control message of type 1. The password matching block 110 checks whether the newly typed password is identical to the registered password or not. If the newly typed password is not identical to the registered password, the password matching block 110 discards the newly typed password and provides a first indication signal S1 of level 2 to the pattern extraction block 120 and the access control block 150. And if the newly typed password is identical to the registered password, the password matching block 110 provides a first indication signal S1 of level 3 to the pattern extraction block 120 and the access control block 150.

The pattern extraction block 120 extracts an owner's timing vector from a keystroke characteristic with which the owner types the newly typed password at the same time when the owner types the newly typed password. Then, the pattern extraction block 120 discards the owner's timing vector in response to the first indication signal S1 of level 2; and stores the owner's timing vector in response to the first indication signal S1 of level 3.

The access control block 150 displays an access control message of type 2 through the display device in response to the first indication signal S1 of level 2, wherein the access control message of type 2 represents that the newly typed password is wrong and requires the owner to type the registered password correctly; and displays the access control message of type 1 through the display device in response to the first indication signal S1 of level 3, wherein the access control message of type 1 requires the owner to type the registered password one more time.

In this way, the pattern extraction block 120 collects the sufficient number of the owner's timing vectors. Thereafter, the pattern extraction block 120 forms a training set consisting of pertinent timing vectors by discarding outliers, wherein the outliers are impertinent timing vectors which are too prominent.

The training set is applied to a neural network 130 in order to train the neural network 130 with a conventional error backpropagation algorithm. The neural network 130 is an autoassociative multilayer perceptron which uses each of timing vectors in the training set as both an input and a desired output.

To be more specific, the neural network 130 is trained to output a vector that is reasonably close to an input timing vector so long as the input timing vector is from the owner though the input timing vector is previously unseen; and to output a vector that is far from an input timing vector when the input timing vector is from an imposter.

At a verification step, an arbitrary user who claims that he is the owner and who can be the true owner or not enters the owner's login name and a password. The owner's login name is applied to the password matching block 110. The user's password is provided to the password matching block 110 and the pattern extraction block 120.

The password matching block 110 checks whether the user's password is identical to the registered password or not. If the user's password is not identical to the registered password, the password matching block 110 provides a first indication signal S1 of level 4 to the pattern extraction block 120 and the access control block 150. And if the user's password is identical to the registered password, the password matching block 110 provides a first indication signal S1 of level 5 to the pattern extraction block 120 and the access control block 150.

The pattern extraction block 120 extracts a user's timing vector from a keystroke characteristic with which the user types the user's password at the same time when the user types the user's password. Then, the pattern extraction block 120 discards the user's timing vector in response to the first indication signal S1 of level 4; and provides the user's timing vector to the neural network 130 and a comparator 140 in response to the first indication signal S1 of level 5.

The access control block 150 displays the access control message of type 2 through the display device in response to the first indication signal S1 of level 4, wherein the access control message of type 2 represents that the password is wrong and requires the user to type the registered password correctly; and displays an access control message of type 3 through the display device in response to the first indication signal S1 of level 5, wherein the access control message of type 3 represents that the password is correct and the user's typing pattern is being checked.

Until the registered password is inputted correctly, the user has several chances to enter a password in this way. If the user fails to enter the registered password correctly in that time, the password matching block 110 provides a first indication signal S1 of level 6 to the access control block 150. The access control block 150 displays an access control message of type 4 through the display device, in response to the first indication signal S1 of level 6, wherein the access control message of type 4 represents that the user is turned out to be an imposter and prohibited from accessing the system.

The neural network 130 ha s already been trained to output a vector that is reasonably close to an input timing vector so long as the input timing vector is from the owner though the input timing vector is previously unseen; and to output a vector that is far from an input timing vector when the input timing vector is from an imposter. Thus the neural network 130 outputs a corresponding vector according to the user's timing vector.

The comparator 140 is provided with the user's timing vector, that is, the input to the neural network 130, the output vector from the neural network 130 and a predetermined threshold TH; and compares a difference between the input and output of the neural network 130 with the TH. If the difference is greater than the TH, the comparator 140 generates a second indication signal S2 of level 7 to the access control block 150; and if otherwise, the comparator 140 generates a second indication signal S2 of level 8 to the access control block 150.

The access control block 150 displays an access control message of type 4 through the display device, in response to the second indication signal S2 of level 7, wherein the access control message of type 4 represents that the user is turned out to be an imposter and prohibited from accessing the system. Meanwhile, the access control block 150 displays an access control message of type 5 through the display device, in response to the second indication signal S2 of level 8 and provides a control signal C to the main system(not shown), wherein the access control message of type 5 represents that the user is identified as the owner and permitted to access the system and the control signal C instructs the system to grant the user to access the main system(not shown).

The registration and the verification procedures are illustrated with reference to flowcharts shown in FIGS. 2 and 3.

Figure 2:
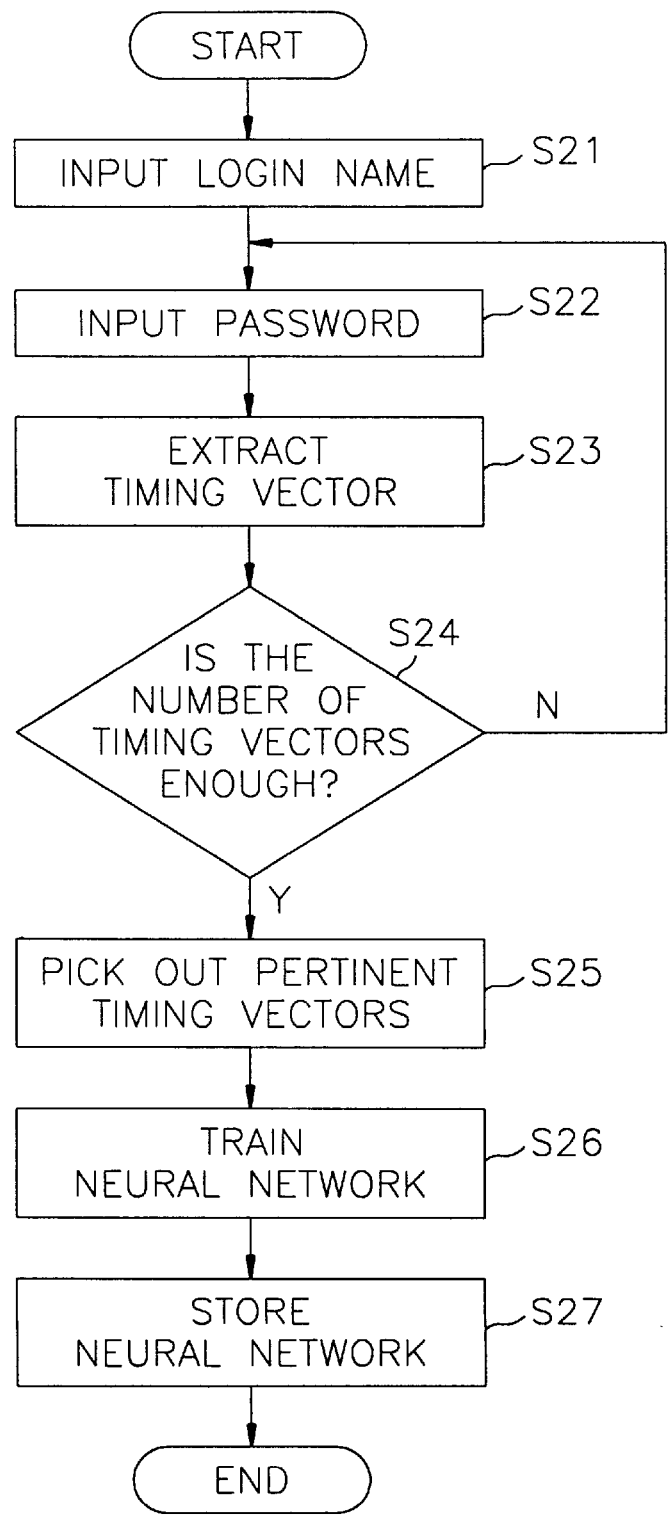
FIG. 2 provides a flowchart showing a registration procedure of an owner's password and typing patterns.

FIG. 2 provides a flowchart showing the registration procedure of an owner's password and typing patterns. The owner types a login name at step S21 and types a password at step S22. The owner's login name and password is stored as a registered login name and a registered password.

At step S23, an owner's timing vector is extracted from a keystroke characteristic with which the owner types the owner's password. And at step S24, it is checked whether the sufficient number of owner's timing vectors are extracted. If the checked result is negative, the procedure goes back to step S22 to thereby be inputted the owner's password again; and if the checked result is affirmative, the procedure goes to step S25, wherein a training set is formed by collecting pertinent timing vectors and discarding impertinent timing vectors.

Then, at step S26, a neural network is trained by using each of the owner's timing vectors in the training set as an input, to output a vector that is reasonably close to an input timing vector so long as the input timing vector is from the owner though the input timing vector is previously unseen; and to output a vector that is far from an input timing vector when the input timing vector is from an imposter.

The trained neural network corresponding to the owner's login name is stored at step S27 and the registration procedure is ended.

Figure 3:
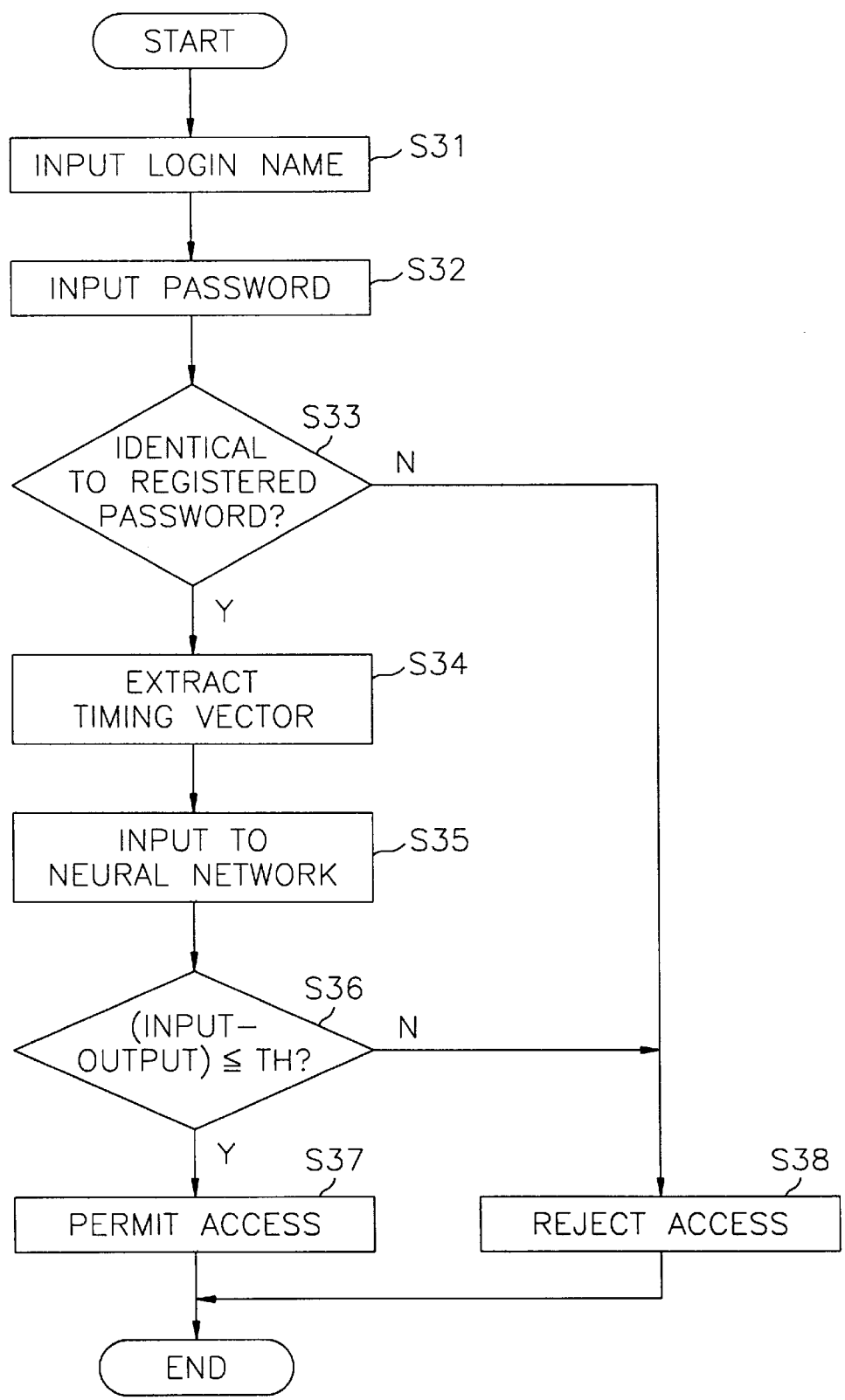
FIG. 3 presents a flowchart showing a verification procedure of a user.

FIG. 3 presents a flowchart showing the verification procedure of a user. The verification procedure starts with steps S31 and S32 wherein an arbitrary user who claims that he is the owner and who can be the true owner or not enters the owner's login name and a user's password.

At step S33, it is checked if the user's password is identical to the registered password. If the checked result is negative, the procedure goes to step S38, wherein the main system prohibits the user from accessing the main system thereto and the verification procedure ends; and if the checked result is affirmative, the procedure goes to step S34, wherein a user's timing vector is extracted from a keystroke characteristic with which the user types the user's password.

Then at step S35, the user's timing vector is applied to the neural network. If the timing vector is from the owner, the neural network outputs a vector that is reasonably close to the timing vector applied thereto though the timing vector is previously unseen; and if the typing pattern is from an imposter, the neural network outputs a vector that is far from the timing vector.

At step S36, a difference between the input and the output of the neural network is compared with a predetermined threshold TH. If the difference is greater than the threshold TH, the procedure goes to step S38, wherein the main system prohibits the user from accessing the main system and the verification procedure ends; and if otherwise, the procedure goes to step S37, wherein the main system permits the user to access the main system and the verification procedure ends.

Since the present invention authenticates an individual by using a password and a typing pattern to type the password, a main system can be doubly protected from being accessed by unregistered individuals with more safety. Furthermore, the present invention experimentally makes the probability of the type 1 error(false rejection) around 1% with limiting the probability of the type 2 error(false acceptance) 0%.

While the present invention has been described with respect to certain preferred embodiments only, other modifications and variations may be made without departing from the spirit and scope of the present invention as set forth in the following claims.

What is claimed is:

1. A user authentication apparatus for use in controlling access to a system comprising:

an input means for inputting an owner's login name and password, and a user's password;

a password matching means for storing the owner's login name and the owner's password and checking whether the user's password is identical to the owner's password or not, to thereby generate a first indication signal;

means for extracting the owner's timing vectors from keystroke characteristics with which the owner repeatedly types the owner's password to thereby form a training set and, in response to the first indication signal from the password matching means extracting a user's timing vector from a keystroke characteristic with which the user types the user's password;

a neural network for being trained by using the training set and generating an output by using the user's timing vector as an input;

means for comparing the difference between the user's timing vector that is inputted to the neural network and the corresponding output of the neural network with a predetermined threshold to thereby generate a second indication signal; and means for controlling access of the user to the system in response to the first and the second indication signals, wherein the password matching means generates the first indication signal of level 1 if the user's password is identical to the owner s password and level 2 if otherwise.

2. The apparatus as recited in claim 1, wherein the user's timing vedctor is extracted from the keystroke characteristic with which the user types the user's password if the first indication signal is of level 1 and does not extract the user's timing vector if the first indication signal is of level 2.

3. The apparatus as recited in claim 2, wherein the comparison means generates the second indication signal of level 3 if the difference is not greater than the threshold and level 4 if otherwise.

4. The apparatus as recited in claim 3, wherein the access control means permits the user to access the system if the first indication signal is of level 1 and the second indication signal is of level 3 and prohibits the user from accessing the system if otherwise.

5. The apparatus as recited in claim 4, wherein a timing vector consists of duration of key strokes and interval times between them.

6. The apparatus as recited in claim 5, wherein the training set is formed by discarding impertinent owner's timing vectors which are too prominent and collecting pertinent owner's timing vectors.

7. The apparatus as recited in claim 6, wherein the neural network is trained by using each of owner's timing vectors in the training set as both an input and a desired output.

8. The apparatus as recited in claim 7, wherein the neural network is an autoassociative multilayer perceptron that is trained by an error backpropagation algorithm.

\* \* \* \* \*